United States Patent
Hong et al.

(10) Patent No.: US 11,609,575 B2
(45) Date of Patent: Mar. 21, 2023

(54) MOBILE ROBOT DEVICE AND METHOD FOR CONTROLLING MOBILE ROBOT DEVICE

(71) Applicant: SAMSUNG ELECTRONICS CO., LTD., Suwon-si (KR)

(72) Inventors: Hyunki Hong, Suwon-si (KR); Jewoong Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 270 days.

(21) Appl. No.: 17/014,004

(22) Filed: Sep. 8, 2020

(65) Prior Publication Data

US 2021/0146552 A1 May 20, 2021

(30) Foreign Application Priority Data

Nov. 20, 2019 (KR) .................. 10-2019-0149864

(51) Int. Cl.
G05D 1/02 (2020.01)
(52) U.S. Cl.
CPC .......... *G05D 1/024* (2013.01); *G05D 1/0225* (2013.01); *G05D 2201/0203* (2013.01)
(58) Field of Classification Search
None
See application file for complete search history.

(56) References Cited

U.S. PATENT DOCUMENTS 5,202,742 A * 4/1993 Frank .................. G05D 1/0236
356/5.1
7,332,890 B2 * 2/2008 Cohen .................. A47L 9/2873
320/109

(Continued)

FOREIGN PATENT DOCUMENTS

CN 104167773 A 11/2014
CN 104282168 B 9/2017

(Continued)

OTHER PUBLICATIONS

International Search Report (PCT/ISA/210), issued by International Searching Authority in corresponding International Application No. PCT/KR2020/012338, dated Nov. 11, 2020.

(Continued)

*Primary Examiner* — Adam R Mott
*Assistant Examiner* — Sagar Kc
(74) *Attorney, Agent, or Firm* — Sughrue Mion, PLLC

(57) ABSTRACT

A mobile robot device and a method for controlling a mobile robot device to more accurately control positioning of the mobile robot device relative to a docking station. The mobile robot device obtains a first position relative to a docking station by scanning surroundings of the mobile robot device using a LiDAR sensor emitting a first frequency, moves the mobile robot device towards the charging station based on the first position, determines whether a distance to the charging station is within a first distance, controls the LiDAR sensor to scan the surroundings of the mobile robot device by changing a frequency of the LiDAR sensor to a second frequency less than the first frequency when the mobile robot device approaches within the first distance, and moves the mobile robot device towards the charging station based on the LiDAR sensor emitting the second frequency.

20 Claims, 11 Drawing Sheets

(56) References Cited

U.S. PATENT DOCUMENTS

| | | | |
|---|---|---|---|
| 7,729,803 B2 * | 6/2010 | Lim | G05D 1/0225 700/218 |
| 8,255,084 B2 * | 8/2012 | Lee | B25J 5/00 700/258 |
| 8,390,251 B2 | 3/2013 | Cohen et al. | |
| 9,052,721 B1 * | 6/2015 | Dowdall | G05D 1/024 |
| 9,145,110 B2 * | 9/2015 | Van Wiemeersch | B60L 53/37 |
| 9,717,387 B1 * | 8/2017 | Szatmary | A47L 9/2805 |
| 9,873,408 B2 | 1/2018 | Capizzo | |
| 10,105,841 B1 * | 10/2018 | Szatmary | G06N 20/00 |
| 10,624,514 B2 | 4/2020 | Park | |
| 10,638,906 B2 | 5/2020 | Herron et al. | |
| 10,838,424 B2 * | 11/2020 | Xiong | B25J 9/1694 |
| 11,036,230 B1 * | 6/2021 | Ebrahimi Afrouzi | G05D 1/0016 |
| 11,037,320 B1 * | 6/2021 | Ebrahimi Afrouzi | G06T 7/90 |
| 11,069,082 B1 * | 7/2021 | Ebrahimi Afrouzi | G06T 7/70 |
| 11,348,269 B1 * | 5/2022 | Ebrahimi Afrouzi | G01S 7/4804 |
| 2010/0076641 A1 * | 3/2010 | Van Den Berg | G05D 1/0246 701/26 |
| 2017/0269212 A1 | 9/2017 | Strang | |
| 2017/0300059 A1 * | 10/2017 | Rust | G01S 17/89 |
| 2017/0369051 A1 * | 12/2017 | Sakai | G01S 17/931 |
| 2018/0149753 A1 * | 5/2018 | Shin | G01S 7/4811 |
| 2018/0249872 A1 * | 9/2018 | Park | G06V 20/64 |
| 2019/0086539 A1 | 3/2019 | Shin et al. | |
| 2019/0086923 A1 * | 3/2019 | Zhang | G05D 1/024 |
| 2019/0092184 A1 * | 3/2019 | Sussman | B60L 53/35 |
| 2019/0183310 A1 | 6/2019 | Herron et al. | |
| 2019/0293765 A1 * | 9/2019 | Jeong | G02B 19/00 |
| 2019/0331767 A1 * | 10/2019 | Xiong | G01S 13/881 |
| 2019/0353758 A1 * | 11/2019 | Shin | G01S 7/4813 |
| 2020/0116498 A1 * | 4/2020 | Xiong | G05D 1/0274 |
| 2020/0124729 A1 * | 4/2020 | Kameyama | G01S 7/481 |
| 2020/0150676 A1 * | 5/2020 | Huang | H02J 7/025 |
| 2020/0158857 A1 * | 5/2020 | Jeon | A47L 7/0085 |
| 2020/0225673 A1 * | 7/2020 | Ebrahimi Afrouzi | G05D 1/0016 |
| 2020/0283019 A1 * | 9/2020 | Van Kampen | B60W 60/0011 |
| 2021/0089040 A1 * | 3/2021 | Ebrahimi Afrouzi | A47L 9/2894 |
| 2021/0138657 A1 * | 5/2021 | Cui | B25J 9/1666 |
| 2021/0302967 A1 * | 9/2021 | Ko | G01S 13/878 |
| 2022/0134567 A1 * | 5/2022 | Ishikawa | B25J 9/1692 700/254 |

FOREIGN PATENT DOCUMENTS

| | | | |
|---|---|---|---|
| CN | 109586360 A | * | 4/2019 |
| CN | 109623839 A | * | 4/2019 |
| CN | 209437169 U | * | 9/2019 |
| DE | 10 2018 132 428 A1 | | 6/2019 |
| JP | 3104558 B2 | * | 2/1995 |
| JP | 7-209421 A | | 8/1995 |
| JP | 3104558 B2 | | 10/2000 |
| KR | 10-0645381 B1 | | 11/2006 |
| KR | 10-0740007 B1 | | 7/2007 |
| KR | 10-1086092 B1 | | 11/2011 |
| KR | 10-1415879 B1 | | 7/2014 |
| KR | 10-1460867 B1 | | 11/2014 |
| KR | 10-1604762 B1 | | 3/2016 |
| KR | 10-1719404 B1 | | 3/2017 |
| KR | 10-2018-0074509 A | | 7/2018 |
| KR | 10-1878827 B1 | | 7/2018 |
| KR | 10-1980697 B1 | | 5/2019 |
| KR | 10-1984101 B1 | | 5/2019 |
| WO | 2005/081074 A1 | | 9/2005 |
| WO | 2018/101631 A2 | | 6/2018 |

OTHER PUBLICATIONS

Written Opinion (PCT/ISA/237) issued by the International Searching Authority in corresponding International Application No. PCT/KR2020/012338, dated Nov. 11, 2020.

Communication dated Aug. 3, 2022, issued by the European Patent Office in counterpart European Application No. 20889472.5.

* cited by examiner

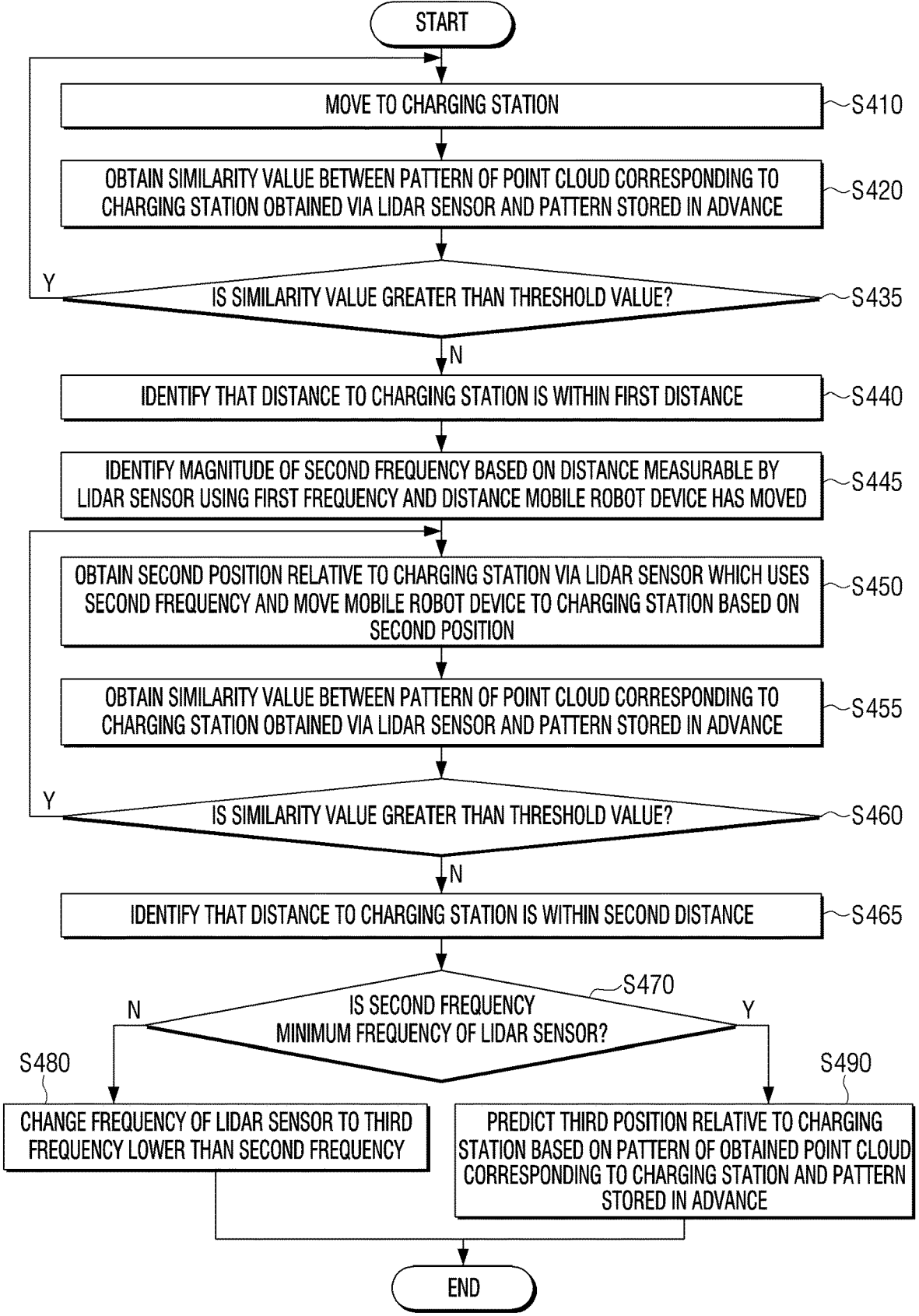

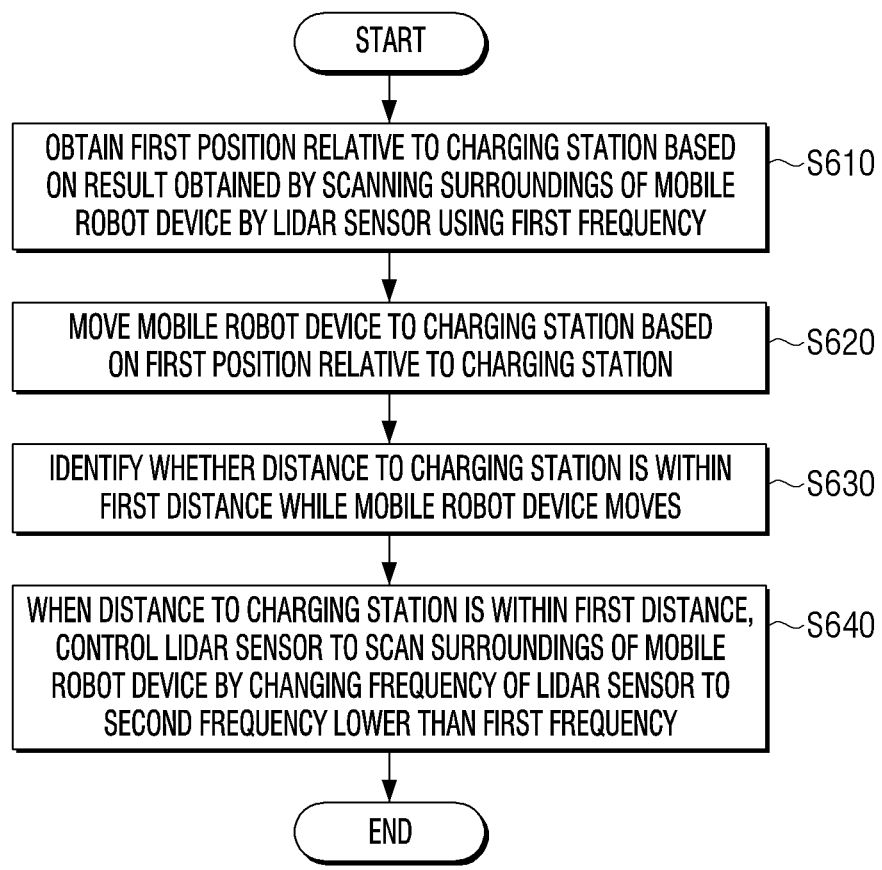

MOBILE ROBOT DEVICE AND METHOD FOR CONTROLLING MOBILE ROBOT DEVICE

CROSS-REFERENCE TO RELATED APPLICATION(S)

This application is based on and claims priority under 35 U.S.C. § 119(a) to Korean Patent Application No. 10-2019-0149864, filed on Nov. 20, 2019, in the Korean Intellectual Property Office, and the disclosure of that is incorporated by reference herein in its entirety.

BACKGROUND

1. Field

The disclosure relates to a mobile robot device and, more particularly to a mobile robot device that changes a scanning frequency of a LiDAR sensor based on a distance to a charging station.

2. Description of Related Art

In general, a mobile robot device is recharged through a wired charging system. However, high current may be necessary to rapidly charge the mobile robot device in a wired manner. Because transmission power increases in accordance with the increase in current, there may be a heat generation problem on a power receiver of the mobile robot device.

Therefore, a wireless charging station capable of charging the mobile robot device in a wireless manner has been actively developed and researched.

Various distance sensors may be attached to the mobile robot device to detect the wireless charging station. Thereby, the mobile robot device may achieve high charging efficiency when the mobile robot device is accurately docked on the wireless charging station according to guidance provided based on positional control of the mobile robot using the sensors. Accordingly, it is possible to more efficiently charge the battery when the accurate docking is performed. However, although various distance sensors are used at a position near the wireless charging station, the mobile robot device may not perform accurate docking if a docking point is not accurately identified.

SUMMARY

In accordance with an aspect of the disclosure, there is provided a mobile robot device including a driving unit configured to control movement of the mobile robot device, a memory, a light detection and ranging (LiDAR) sensor configured to emit first light of a first frequency and second light of a second frequency that is less than the first frequency, and a processor configured to obtain a first position of the mobile robot device relative to a charging station based on scanning a surrounding environment of the mobile robot device by the LiDAR sensor emitting the first light, control the driving unit to move the mobile robot device towards the charging station based on the first position of the mobile robot device relative to the charging station, identify whether a distance from the mobile robot device to the charging station is within a first distance, based on the distance from the mobile robot device to the charging station being within the first distance, obtain a second position of the mobile robot device relative to the charging station based on scanning the surrounding environment of the mobile robot device by the LiDAR sensor emitting the second light, and control the driving unit to move the mobile robot device towards the charging station based on the second position of the mobile robot device relative to the charging station.

In accordance with another aspect of the disclosure, there is provided a method for controlling a mobile robot device including a LiDAR sensor and a driving unit, the method including obtaining a first position of the mobile robot device relative to a charging station based on scanning a surrounding environment of the mobile robot device by the LiDAR sensor emitting first light of a first frequency, moving the mobile robot device towards the charging station based on the first position of the mobile robot device relative to the charging station, identifying whether a distance from the mobile robot device to the charging station is within a first distance, based on the distance from the mobile robot device to the charging station being within the first distance, obtaining a second position of the mobile robot device relative to the charging station based on scanning the surrounding environment of the mobile robot device by the LiDAR sensor emitting a second light of a second frequency less than the first frequency, and moving the mobile robot device towards the charging station based on the second position of the mobile robot device relative to the charging station.

BRIEF DESCRIPTION OF THE DRAWINGS

The above and other aspects, features, and advantages of certain embodiments of the disclosure will be more apparent from the following description taken in conjunction with the accompanying drawings, in that:

FIG. 4 is a flowchart for illustrating a method of controlling the mobile robot device according to an embodiment;

FIG. 6 is a view for illustrating a method of controlling the mobile robot device according to an embodiment.

DETAILED DESCRIPTION

Figure 1A:
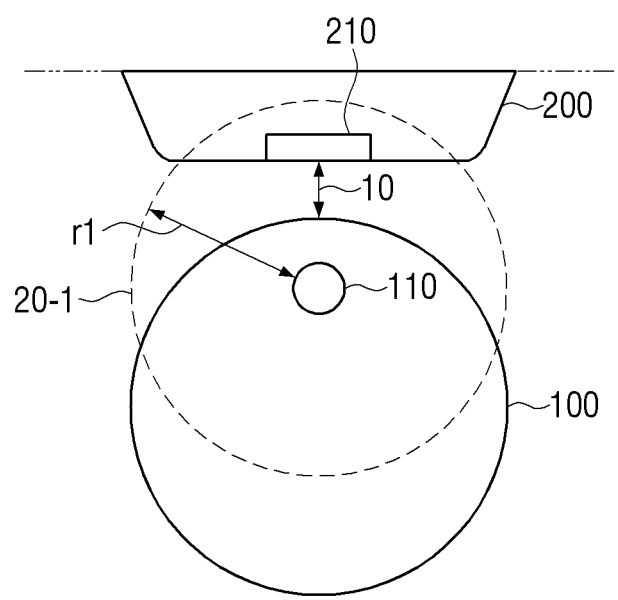
FIG. 1A is a view for illustrating an operation of a mobile robot device according to an embodiment.

Hereinafter, various embodiments of the disclosure are disclosed. It should be noted that the technologies disclosed in this disclosure are not for limiting the scope of the disclosure to a specific embodiment, but should be interpreted to include all modifications, equivalents and/or alternatives of the embodiments of the disclosure. In this disclosure, the terms such as "comprise," "may comprise," "consist of," or "may consist of" are used herein to designate a presence of corresponding features (e.g., constituent elements such as number, function, operation, or part), and not to preclude a presence of additional features.

In this disclosure, expressions such as "A or B," "at least one of A [and/or] B" or "one or more of A [and/or] B," include all possible combinations of the listed items. For example, "A or B," "at least one of A and B" or "at least one of A or B" includes any of (1) at least one A, (2) at least one B, or (3) at least one A and at least one B.

The expressions "first," "second," and the like used in the disclosure may denote various elements, regardless of order and/or importance, and may be used to distinguish one element from another, and does not limit the elements. For example, a first user device and a second user device may represent user devices different from each other, regardless of order and/or importance.

For example, a first element may be referred to as a second element and the second element may also be similarly referred to as the first element, while not departing from the scope of a right of the disclosure.

A term such as "module," a "unit," or a "part" used in the disclosure is for designating a component executing at least one function or operation, and such a component may be implemented as hardware, software, or a combination of hardware and software. Further, except for when each of a plurality of "modules," "units," "parts" and the like needs to be realized in an individual specific hardware, the components may be integrated in at least one module or chip and be implemented in at least one processor. In this disclosure, a term "user" may refer to a person using an electronic device or a device (e.g., an artificial intelligence electronic device) using an electronic device.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on context. The expression "configured to (or set to)" does not necessarily refer to a device being "specifically designed to" in terms of hardware. Instead, under some circumstances, the expression "a device configured to" may refer to the device being "capable of" performing an operation together with another device or component. For example, the phrase "a processor configured (or set) to perform A, B, and C" may refer, for example, and without limitation, to a dedicated processor (e.g., an embedded processor) for performing the corresponding operations, a generic-purpose processor (e.g., a CPU or an application processor), or the like, that can perform the operations by executing one or more software programs stored in a memory device.

The terms used in the description are used to describe an embodiment, but may not intend to limit the scope of other embodiments. Unless otherwise defined specifically, a singular expression may encompass a plural expression. The terms used herein including technical or scientific terms may refer to the same terms generally understood by those skilled in the art in the technical field of the disclosure. The terms defined in normal dictionaries among the terms used in the disclosure may be interpreted as the same or similar meanings in the related technologies and are not interpreted as ideal or excessively formal meanings.

In some cases, the terms defined in the disclosure may not be interpreted to exclude the embodiments of the disclosure.

Hereinafter, the disclosure will be described in more detail with reference to the drawings. In describing the disclosure, a detailed description of the related art or configuration is omitted when it is identified that the detailed description may unnecessarily obscure a gist of the disclosure. In relation to explanation of the drawings, similar reference numerals may be used for similar elements.

The disclosure has been made in view of aforementioned needs and an object of the disclosure is to provide a mobile robot device that accurately recognizes a position of a charging station by changing a scanning frequency of a distance sensor based on a distance to the charging station and a method for controlling thereof.

Hereinafter, the disclosure will be described in more detail with reference to the drawings.

Figure 1B:
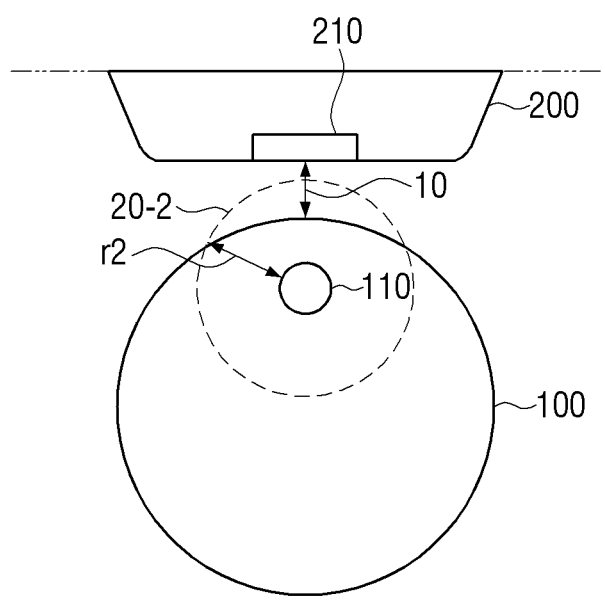
FIG. 1B is a view for illustrating an operation of the mobile robot device according to an embodiment.

FIGS. 1A and 1B are views for illustrating an operation of a mobile robot device according to embodiments. The mobile robot device 100 illustrated in FIG. 1A may be implemented to perform operations such as cleaning, air purification, guarding, and the like while traveling within a space of a building, a household robot that does housework while traveling within a space of a house, and a military robot that works in a dangerous area that is inaccessible by human beings, but the mobile robot is not limited thereto, and the robot may be implemented as robots performing any manner of various operations and tasks.

The mobile robot device 100 may obtain a first position relative to a charging station 200 based on a result obtained by scanning a surrounding environment or space of the mobile robot device 100 using a first frequency by a light detection and ranging (LiDAR) sensor 110. The first position relative to the charging station 200 may include information regarding a distance and a direction from the mobile robot device 100 to the charging station 200 (or a docking point 210 of the charging station 200). In addition, the distance from the mobile robot device 100 to the charging station 200 may include a shortest straight line distance between the mobile robot device 100 and the docking point 210 of the charging station 200.

The LiDAR sensor 110 included in the mobile robot device 100 may obtain information regarding physical characteristics related to a target object (a distance between the mobile robot device 100 and a target object, a direction thereof, a shape and a moving speed of the target object, and the like) by using a period of time taken for returning of a laser pulse that is emitted and scattered or reflected by the target device, an intensity of the scattered or reflected laser pulse, a frequency thereof, and a change in polarized state thereof. Accordingly, the mobile robot device 100 may obtain information regarding the presence of the charging station 200, and the distance and direction from the mobile robot device 100 to the charging station 200 based on the laser pulse reflected from the charging station 200 while scanning the surroundings of the mobile robot device 100 using the LiDAR sensor 110.

The mobile robot device 100 may move to the charging station 200 based on the relative first position. Specifically, the mobile robot device 100 may identify a distance and a direction to the docking point 210 of the charging station 200 through the relative first position. In addition, the mobile robot device 100 may rotate a main body in the identified direction and move by the identified distance.

The mobile robot device 100 may identify whether the distance to the charging station 200 is within a first distance 10 by various methods while moving to the charging station 200. The first distance may be a reference distance for the mobile robot device 100 to determine whether to change a frequency of the LiDAR sensor 110.

In an embodiment, the mobile robot device 100 may identify whether the distance to the charging station 200 is within the first distance based on information regarding the prestored first distance. The information regarding the first distance for the mobile robot device 100 may be utilized to determine whether to change the frequency of the LiDAR sensor 110, and such information may be stored in advance in a memory 130 of the mobile robot device 100. The information regarding the prestored first distance stored may be a setting of the mobile robot device 100 changed by a user.

Specifically, the mobile robot device 100 may obtain a distance to the charging station 200 via the LiDAR sensor 110. The mobile robot device 100 may identify whether the distance to the charging station 200 is currently within the first distance through the information regarding the prestored first distance.

The mobile robot device 100 may store information regarding a plurality of predetermined distances for determining whether to additionally change the frequency (e.g., information regarding second and third distances, and the like), in addition to the information regarding the first distance to the charging station 200. Accordingly, the mobile robot device 100 may identify when the mobile robot device 100 approaches within the various distances to the charging station 200, among the plurality of predetermined distances, based on the information regarding the predetermined distances. The information regarding the plurality of predetermined distances will be described in detail with references to FIGS. 3A to 3C.

In another embodiment, the mobile robot device 100 may identify whether the distance to the charging station 200 is within the first distance based on a point cloud corresponding to the charging station 200 obtained via the LiDAR sensor 110.

Specifically, the mobile robot device 100 may obtain the point cloud corresponding to the charging station 200 via the LiDAR sensor 110. The mobile robot device 100 may identify a geometric shape of an object positioned around the mobile robot device 100 in a shape of the point cloud via the LiDAR sensor 110.

The point cloud is a set of points including data in a three-dimensional space and may be obtained via the LiDAR sensor 110, a RGB-depth (D) sensor, and the like. In an embodiment, the mobile robot device 100 may emit a laser to surroundings of the mobile robot device 100 via the LiDAR sensor 110 and obtain distance information from the mobile robot device 100 to an object that has reflected the laser, through time taken for reflection of the emitted laser to be received. If the current position of the mobile robot device is set as a starting point in the three-dimensional coordinate system, the mobile robot device 100 may generate points corresponding to the object that has reflected the laser based on the obtained distance information. Accordingly, the mobile robot device 100 may obtain a point cloud in the three-dimensional coordinate system showing a geometric shape of the object (e.g., charging station 200) positioned in a vicinity of the mobile robot device 100 via the LiDAR sensor 110.

A shortest measurable distance of the LiDAR sensor 110 may change depending on a frequency value used by the LiDAR sensor 110. The LiDAR sensor 110 may not obtain the distance and position information of the object at a distance shorter than the shortest measurable distance. In addition, the LiDAR sensor 110 may not obtain a point cloud corresponding to an object at a distance shorter than the shortest measurable distance. For example, as illustrated in FIG. 1A, the shortest measurable distance of the LiDAR sensor 110 that uses the first frequency may be r1. In other words, the mobile robot device 100 may not obtain a point cloud corresponding to an object positioned within a circle 20-1 having the shortest measurable distance r1 as a radius via the LiDAR sensor 110 that operates using the first frequency. Accordingly, the mobile robot device 100 may not obtain the point cloud of the charging station 200 corresponding to a region in the minimum measurable circle 20-1 via the LiDAR sensor 110.

The mobile robot device 100 may obtain a similarity value between a pattern of the point cloud corresponding to the charging station obtained via the LiDAR sensor 110 and a predetermined pattern. Specifically, the mobile robot device 100 may store a pattern of the point cloud (e.g., the number of points, shape formed of point cloud, and the like) corresponding to the charging station 200 in the memory 130. The mobile robot device 100 may obtain a value of similarity between both patterns by comparing the pattern of the obtained point cloud corresponding to the charging station with the point cloud corresponding to the charging station 200 stored in memory 130.

Meanwhile, the mobile robot device 100 may identify whether the obtained similarity value exceeds a threshold value. The threshold value may be a predetermined value and may be modified as a setting by a user. In an embodiment, if the similarity value is identified to be less than the threshold value, the mobile robot device 100 may identify that the distance to the charging station 200 is within the first distance 10. For example, as illustrated in FIG. 1A, since a part of the charging station 200 is included in the circle having the shortest measurable distance r1 of the LiDAR sensor 110 as a radius, the mobile robot device 100 may not obtain the point cloud corresponding to the entire charging station 200. Accordingly, the mobile robot device 100 may identify that the similarity value between the pattern of the obtained point cloud corresponding to the charging station and the predetermined point cloud to be less than the threshold value. When the similarity value is identified to be less than the threshold value, the mobile robot device 100 may identify that the distance to the charging station is within the first distance 10.

In another example, when the similarity value is identified to be equal to or greater than the threshold value, the mobile robot device 100 may move to the charging station 200 based on the first position relative to the charging station. For example, when a part of the charging station 200 is not included in the shortest measurable distance circle 20-1 of the LiDAR sensor 110 that uses the first frequency, the mobile robot device 100 may obtain the point cloud corresponding to the entire charging station 200 via the LiDAR sensor 110. Accordingly, the mobile robot device 100 may obtain the similarity value equal to or greater than the threshold value, when calculating the similarity value between the pattern of the obtained point cloud and the predetermined pattern. At this time, the mobile robot device 100 may identify that the current distance to the charging station 200 is not within the first distance and continuously move to the charging station based on the obtained first position relative to the charging station.

When the distance to the charging station 200 is identified to be within the first distance, the mobile robot device 100 may change the frequency of the LiDAR sensor 110 to a second frequency less than the first frequency. As illustrated in FIG. 1B, when the mobile robot device 100 changes the frequency of the LiDAR sensor 110 to the second frequency less than the first frequency, the shortest measurable distance of the LiDAR sensor 110 may decrease from r1 to r2. In other words, in the mobile robot device 100, as the frequency of the LiDAR sensor 110 decreases, the distance measurable by the LiDAR sensor 110 may increase.

Meanwhile, when the distance to the charging station 200 is identified to be within the first distance, the mobile robot device 100 may identify a magnitude of the second frequency based on a distance measurable by the LiDAR sensor 110 using the first frequency and a distance the mobile robot device 100 has traveled. The embodiment of determining the second frequency based on the distance the mobile robot device 100 has traveled will be described in detail with reference to FIGS. 3A and 3B.

When the frequency of the LiDAR sensor 110 is changed to the second frequency less than the first frequency, the mobile robot device 100 may obtain a second position relative to the charging station 200 via the LiDAR sensor that uses the second frequency. For example, as illustrated in FIG. 1B, since the shortest measurable distance of the LiDAR sensor 110 is decreased from r1 to r2 along with a decrease in frequency, the mobile robot device 100 may obtain information regarding a distance to and a position of the charging station 200 via the LiDAR sensor 110 based on the current position. The mobile robot device 100 may move to the charging station 200 based on the obtained relative second position.

Meanwhile, when the first frequency is a minimum frequency among frequencies available to the LiDAR sensor 110, the mobile robot device 100 may not decrease the frequency of the LiDAR sensor 110 to the second frequency less than the first frequency, even if the distance to the charging station 200 is identified to be within the first distance. At this time, the mobile robot device 100 may predict the second position relative to the charging station based on the pattern of the point cloud corresponding to the charging station obtained via the LiDAR sensor 110 and the pattern stored in advance. The embodiment of predicting the position relative to the charging station will be described in detail with reference to FIGS. 3B and 3C.

When the mobile robot device 100 docks on the charging station 200, the mobile robot device 100 may identify whether to additionally move the mobile robot device 100 to a docking point of the charging station 200 based on an amount of charged power received from the charging station 200. The embodiment of additionally moving the mobile robot device 100 based on the amount of the charged power will be described in detail with reference to FIGS. 5A and 5B.

Figure 2A:
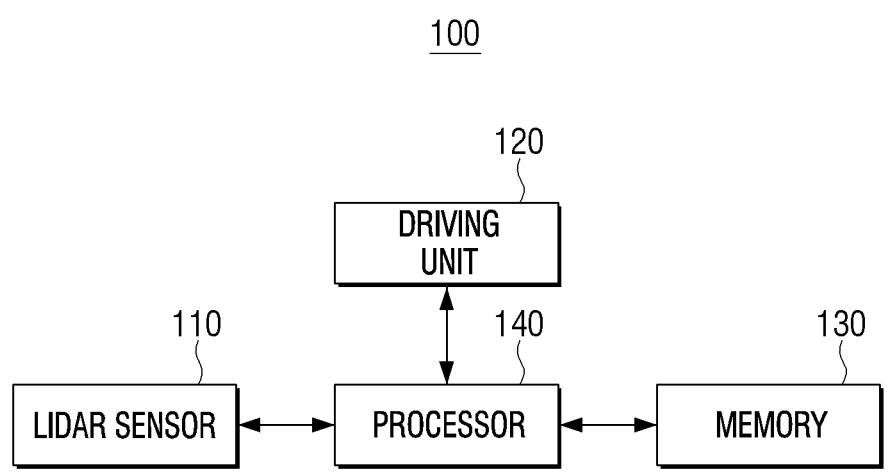
FIG. 2A is a block diagram schematically illustrating a configuration of the mobile robot device according to an embodiment.

FIG. 2A is a block diagram schematically illustrating a configuration of the mobile robot device 100 according to an embodiment. As illustrated in FIG. 2A, the mobile robot device 100 may include the LiDAR sensor 110, a driving unit 120, a memory 130, and a processor 140. The configuration illustrated in FIG. 2A is an exemplary diagram for implementing the embodiment of the disclosure, and suitable hardware and software configurations that are apparent to those skilled in the art may be additionally included in the mobile robot device 100.

The LiDAR sensor 110 may obtain information regarding physical characteristics related to a target object by using a period of time taken for returning of a laser pulse that is emitted and scattered or reflected by the target device, an intensity of the scattered or reflected laser pulse, a frequency thereof, and a change in polarized state thereof.

Specifically, the LiDAR sensor 110 may obtain a point cloud including data corresponding to an object positioned around the mobile robot device 100. The LiDAR sensor 110 may change the frequency under the control of the processor 140.

The driving unit 120 may be an element capable of conveying the mobile robot device 100 under the control of the processor 140 and may include a motor and a plurality of wheels driven by the motor. Specifically, the driving unit 120 may change a movement direction or a movement speed of the mobile robot device 100 under the control of the processor 140.

The memory 130 may store instructions or data related to control of the mobile robot device 100. The instruction may be an action statement for the processor 140 in a programming language and is a minimum unit of a program executable directly by the processor 140. In an embodiment, the memory 130 may be implemented as a non-volatile memory, a volatile memory, a flash memory, a hard disk drive (HDD), or a solid state drive (SSD). The memory 130 may be accessed by the processor 140 and reading, recording, editing, deleting, or updating of the data by the processor 140 may be executed. A term, memory, in the disclosure may include the memory 130, a ROM and RAM in the processor 140, or a memory card (e.g., micro SD card or memory stick) disposed within the mobile robot device 100. In addition, the memory 130 may store programs, data, and the like for configuring various screens to be displayed in a display region of the display 160.

In particular, the memory 130 may store the point cloud corresponding to the charging station 200 in advance. The memory 130 may store the point cloud corresponding to an object (e.g., charging station 200) around the mobile robot device 100 obtained via the LiDAR sensor 110.

Further, the memory 130 may store information regarding predetermined distances for determining whether to change the frequency of the LiDAR sensor 110 (e.g., information regarding the first, second, and third distances to the charging station 200) in advance. The information regarding the predetermined distance stored in the memory in advance may be changed by a user input.

The processor 140 may be electrically connected to the memory 130 to control general operations and functions of the mobile robot device 100. Particularly, the processor 140 may obtain the first position relative to the charging station 200 based on a result obtained by scanning the surroundings of the mobile robot device 100 by the LiDAR sensor 110 using the first frequency. Specifically, the processor 140 may obtain the information regarding the distance and the direction to the charging station 200 (or the docking point of the charging station 200) via the LiDAR sensor 110.

The processor 140 may control the driving unit 120 so that the mobile robot device 100 moves to the charging station 200 based on the obtained first position relative to the charging station 200. For example, the processor 140 may identify a direction and a shortest straight line distance from the mobile robot device 100 to the docking point 210 of the charging station 200 based on the relative first position. The processor 140 may control the driving unit 120 to move in the direction to the docking point 210 of the charging station 200 by the identified distance.

The processor 140 may identify whether the distance to the charging station 200 is within the first distance while the mobile robot device 100 moves.

In an embodiment, the processor 140 may identify whether the distance to the charging station 200 is within the first distance based on the information regarding the first distance stored in the memory 130. Specifically, the processor 140 may identify the current distance between the mobile robot device 100 and the charging station 200 via the LiDAR sensor 110 while the mobile robot device 100 moves. In addition, the processor 140 may identify whether the distance between the mobile robot device 100 that is moving and the charging station 200 is within the first distance based on the information regarding the first distance stored in the memory 130. In the same manner, the processor 140 may identify whether the distance to the charging station is within the second and third distances based on the information regarding the predetermined distance stored in the memory 130.

In still another embodiment, the processor 140 may identify whether the distance to the charging station 200 is within the first distance based on the pattern of the point cloud corresponding to the charging station 200 obtained via the LiDAR sensor 110. Specifically, the processor 140 may obtain the similarity value between the pattern of the point cloud corresponding to the charging station 200 obtained via the LiDAR sensor 110 and the pattern stored in the memory 130. For example, the processor 140 may obtain the value showing the similarity by comparing the pattern of the point cloud (e.g., the number of points and the shape formed of the point cloud) corresponding to the charging station 200 obtained via the LiDAR sensor 110 with the pattern stored in memory 130.

The processor 140 may identify whether the obtained similarity value exceeds the threshold value. When the similarity value is identified to be less than the threshold value, the processor 140 may identify that the distance to the charging station 200 is within the first distance. On the other hand, when the similarity value is identified to be equal to or greater than the threshold value, the processor 140 may control the driving unit 120 so that the mobile robot device 100 moves to the charging station 200 based on the obtained first position relative to the charging station 200.

When the distance to the charging station 200 is within the first distance, the processor 140 may control the LiDAR sensor 110 to scan the surroundings of the mobile robot device 100 by changing the frequency of the LiDAR sensor 110 to the second frequency less than the first frequency. When the frequency of the LiDAR sensor 110 is decreased, the shortest measurable distance decreases. Accordingly, when the distance to the charging station 200 is identified to be within the first distance, the processor 140 may accurately obtain the information regarding the distance and the direction to the charging station 200 via the LiDAR sensor 110 by changing the frequency to the second frequency less than the first frequency.

In an embodiment, when the distance to the charging station 200 is identified to be within the first distance, the processor 140 may identify a magnitude of the second frequency based on the distance measurable by the LiDAR sensor 110 using the first frequency and the distance the mobile robot device 100 has moved. Specifically, the processor 140 may obtain the distance the mobile robot device 100 has moved from when the first position relative to the charging station 200 is obtained until when the distance to the charging station 200 is identified to be within the first distance via the LiDAR sensor 110. The processor 140 may calculate a current distance between the mobile robot device 100 and the docking point 210 of the charging station 200 based on the distance the mobile robot device 100 has moved. The processor 140 may predict a region of the docking point 210 that may be included in the minimum measurable circle of the LiDAR sensor 110 that uses the first frequency, while the mobile robot device 100 moves from the current position to a position separated from the docking point 210 of the charging station 200 by a threshold distance. The processor 140 may calculate and identify the second frequency of the LiDAR sensor 110 so that the docking point 210 is not included within the minimum measurable distance circle, when the mobile robot device 100 is at a position separated from the docking point 210 by a threshold distance, based on the predicted region of the docking point 210. The processor 140 may control the LiDAR sensor 110 to change the frequency of the LiDAR sensor 110 from the first frequency to the identified second frequency. When the second frequency of the LiDAR sensor 110 calculated by the processor 140 is beyond a variable frequency range of the LiDAR sensor 110, the processor 140 may control the LiDAR sensor 110 to change the frequency of the LiDAR sensor 110 to the minimum frequency from among the variable frequencies.

In still another embodiment, when the distance to the charging station 200 is identified to be within the first distance, the processor 140 may control the LiDAR sensor 110 to change the frequency of the LiDAR sensor 110 from the first frequency to the second frequency by a predetermined value. The predetermined value may vary depending on a size and a type of the mobile robot device 100 and may also be changed according to a setting of the mobile robot device 100 by a user.

When the frequency of the LiDAR sensor 110 is changed to the second frequency, the processor 140 may obtain the second position relative to the charging station 200 via the LiDAR sensor 110 that uses the second frequency. In addition, the processor 140 may control the driving unit 120 to move the mobile robot device 100 to the charging station 200 based on the second position relative to the charging station 200.

While the mobile robot device 100 moves, when the distance to the charging station 200 is identified to be within the second distance via the LiDAR sensor 110 that uses the second frequency, the processor 140 may control the LiDAR sensor 110 to scan the surroundings of the mobile robot device 100 by changing the frequency of the LiDAR sensor 110 to a third frequency less than the second frequency. In an embodiment, the processor 140 may identify whether the distance to the charging station 200 is within the second distance based on the information regarding the second distance stored in the memory 130. Specifically, the processor 140 may identify whether the distance to the charging station 200 obtained via the LiDAR sensor 110 is within the second distance stored in memory 130. The information regarding the second distance stored in memory 130 may be changed by a user input that changes the setting of the mobile robot device 100.

The processor 140 may identify whether the distance to the charging station 200 is within the second distance based on the point cloud corresponding to the charging station 200 obtained via the LiDAR sensor 110 that uses the second frequency. Specifically, when the similarity value between the pattern of the point cloud corresponding to the charging station obtained via the LiDAR sensor 110 that uses the second frequency and the pattern of the point cloud stored in advance exceeds a threshold value, the processor 140 may identify that the distance to the charging station 200 is within the second distance. The specific configuration is similar to the processor 140 identifying whether the distance to the charging station 200 is within the first distance, and therefore a redundant description will not be repeated. The process of determining the third frequency by the processor 140 is also similar to the process of determining the second frequency, and therefore a redundant description will not be repeated.

When the mobile robot device 100 is docked on the charging station 200, the processor 140 may identify whether to adjust the mobile robot device 100 to the docking point of the charging station based on the amount of charged power received from the charging station 200. Specifically, when the amount of charged power received from the charging station 200 is less than a predetermined value, the processor 140 may identify to additionally move the mobile robot device 100. Then, the processor 140 may obtain a position relative to the docking point of the charging station via the LiDAR sensor 110 and control the driving unit 120 to move to the docking point of the charging station 200 based on the obtained position. When the accurate docking between the mobile robot device 100 and the charging station 200 is not accomplished, the charging efficiency may decrease and a transmission resonator of the mobile robot device 100 may be overheated. Accordingly, the processor 140 may obtain the position relative to the charging station 200 via the LiDAR sensor 110 and control the driving unit 120 to additionally move the mobile robot device 100 to the charging station 200 based on the relative position, in order to perform more accurate docking.

When the amount of charged power received from the charging station 200 is equal to or greater than the predetermined value, the processor 140 may stop the movement of the mobile robot device 100 and receive the power from the charging station 200.

When the second frequency is the minimum frequency of the LiDAR sensor 110, if the distance to the charging station 200 is identified to be within the second distance via the LiDAR sensor 110 that uses the second frequency, the processor 140 may predict the third position relative to the charging station 200 based on the pattern of the point cloud corresponding to the charging station 200 obtained via the LiDAR sensor 110 and the pattern stored in memory 130. For example, when the similarity value between the pattern of the point cloud corresponding to the charging station 200 obtained via the LiDAR sensor 110 that uses the second frequency and the pattern stored in advance is identified to be less than a threshold value, the processor 140 may control the LiDAR sensor 110 to decrease the frequency of the LiDAR sensor 110 to the third frequency less than the second frequency. However, when the second frequency is the minimum frequency of the LiDAR sensor 110, the processor 140 may not further decrease the frequency of the LiDAR sensor 110. Accordingly, the processor 140 may predict the current distance and direction to the charging station 200 by comparing the pattern of the obtained point cloud corresponding to the charging station 200 obtained before the distance to the charging station 200 is identified to be within the second distance with the pattern stored in memory 130. The processor 140 may control the driving unit 120 to move the mobile robot device 100 to the charging station 200 based on the predicted distance and direction.

The processor 140 may include one or more of a central processing unit (CPU), a microcontroller unit (MCU), a microprocessing unit (MPU), a controller, an application processor (AP), or a communication processor (CP), and an ARM processor or may be defined as the corresponding term. In addition, the processor 140 may be implemented as System on Chip (SoC) or large scale integration (LSI) including the processing algorithm or may be implemented in form of a Field Programmable gate array (FPGA). The processor 140 may perform various functions by executing computer executable instructions stored in the memory 130.

Figure 2B:
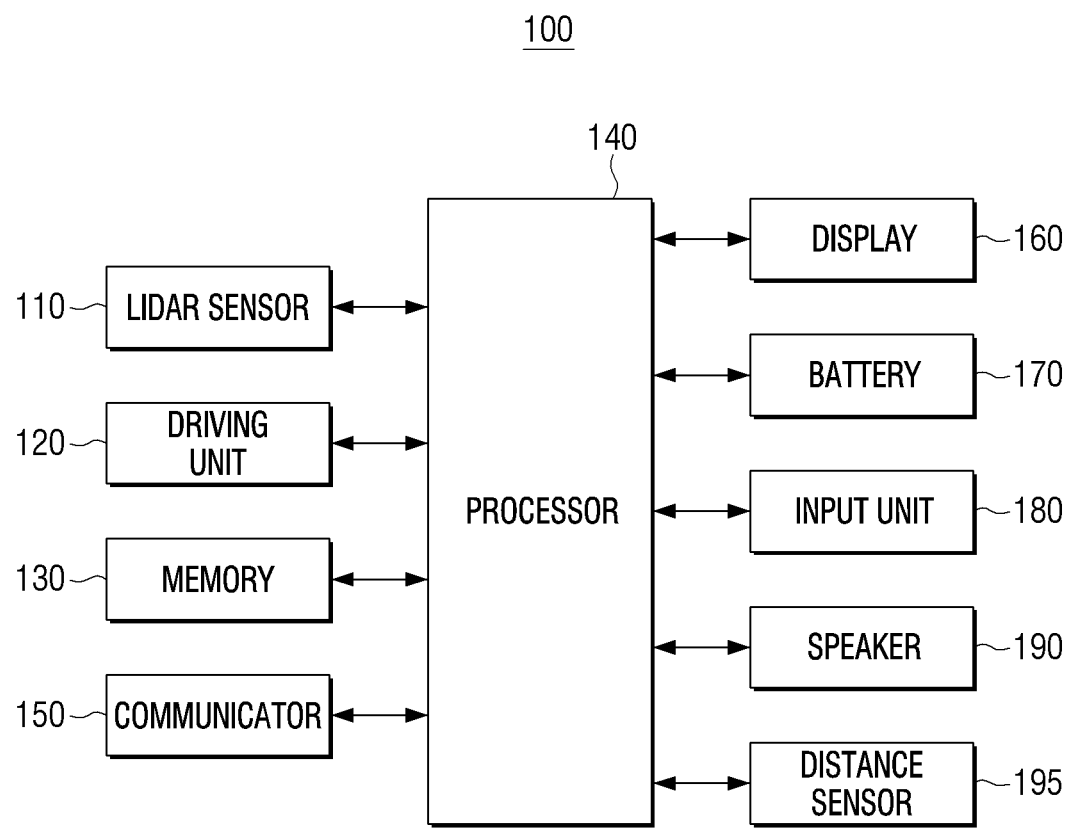
FIG. 2B is a block diagram specifically illustrating a configuration of the mobile robot device according to an embodiment.

FIG. 2B is a block diagram illustrating a configuration of the mobile robot device 100 according to an embodiment. As illustrated in FIG. 2B, the mobile robot device 100 may include the LiDAR sensor 110, the driving unit 120, the memory 130, the processor 140, a communicator 150, a display 160, a battery 170, an input unit 180, a speaker 190, and a distance sensor 195. The LiDAR sensor 110, the driving unit 120, the memory 130, and the processor 140 have been described with reference to FIG. 2A and therefore redundant descriptions thereof will not be repeated.

The communicator 150 may perform communication with an external device and an external server via various wired or wireless communication methods. The communication connection of the communicator 150 with the external device and the external server may include networked communication via a third device (e.g., a repeater, a hub, an access point, a gateway, or the like).

The communicator 150 may include various communication modules to communicate with the external device. In an example, the communicator 150 may include wireless communication modules and, for example, include a cellular communication module using at least one of LTE, LTE Advance (LTE-A), code division multiple access (CDMA), wideband CDMA (WCDMA), universal mobile telecommunications system (UMTS), Wireless Broadband (WiBro), or global system for mobile communications (GSM). In another example, the wireless communication module may, for example, include at least one of wireless fidelity (Wi-Fi), Bluetooth, Bluetooth Low Energy (BLE), and Zigbee. The communicator 150 may perform wired or wireless communication through connection with the charging station 200 when docked.

The display 160 may display various pieces of information under the control of the processor 140. In particular, the display 160 may display the pattern of the point cloud corresponding to the charging station 200 obtained via the LiDAR sensor 110 under the control of the processor 140. In addition, the display 160 may display a user interface (UI) for receiving user input to change settings or control the mobile robot device 100, for example changing the predetermined distance information to the charging station 200 under the control of the processor 140.

The display 160 may also be implemented as a touch screen together with a touch panel. There is no limitation to the above implementation, and the display 160 may be variously implemented.

The battery 170 is an element for supplying power of the mobile robot device 100 and the battery 170 may be charged by the charging station 200. In an embodiment, the battery 170 may include a reception resonator for wireless charging. Accordingly, the reception resonator of the battery 170 may receive the power from the transmission resonator of the charging station 200. The battery 170 may transmit the information regarding the amount of power received from the charging station 200 to the processor 140.

In an embodiment, a charging method of the battery 170 may be a constant current constant voltage (CCCV) charging method for rapidly charging a predetermined amount through a constant current (CC) charging method and charging the remaining amount through a constant voltage (CV) method and any inductive charging scheme, but the charging method is not limited thereto, and the battery 170 may be charged by various methods.

The input unit 180 may receive various user inputs and transmit the user inputs to the processor 140. In particular, the input unit 180 may include a touch sensor, a (digital) pen sensor, a pressure sensor, and a key. The touch sensor may use, for example, at least one type of an electrostatic type, a pressure-sensitive type, an infrared type, or an ultrasonic type. The input unit 180 may be incorporated into the display 160 as a touch sensitive display.

Particularly, when a user command for changing the information regarding the predetermined distance to the charging station 200 is input, the input unit 180 may receive a signal including the user command and transmit the signal to the processor 140.

The distance sensor 195 is an additional element for obtaining the distance information between the mobile robot device 100 and the charging station 200 excluding the LiDAR sensor 110 and may include an infrared ray sensor, an ultrasonic sensor, a radio frequency (RF) sensor, and the like. Accordingly, the processor 140 may obtain the distance information to the charging station 200 via various distance sensors 195, in addition to the LiDAR sensor 110.

Figure 3A:
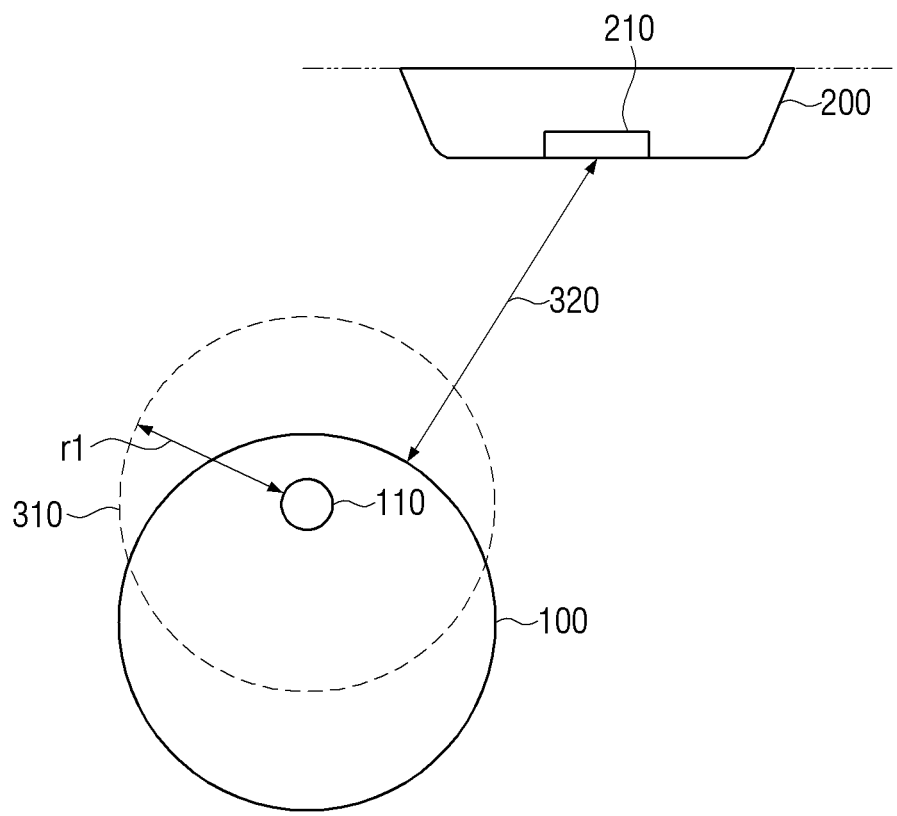
FIG. 3A is a view for illustrating a process in which the mobile robot device decreases a frequency of a LiDAR sensor 110 according to an embodiment.
Figure 3B:
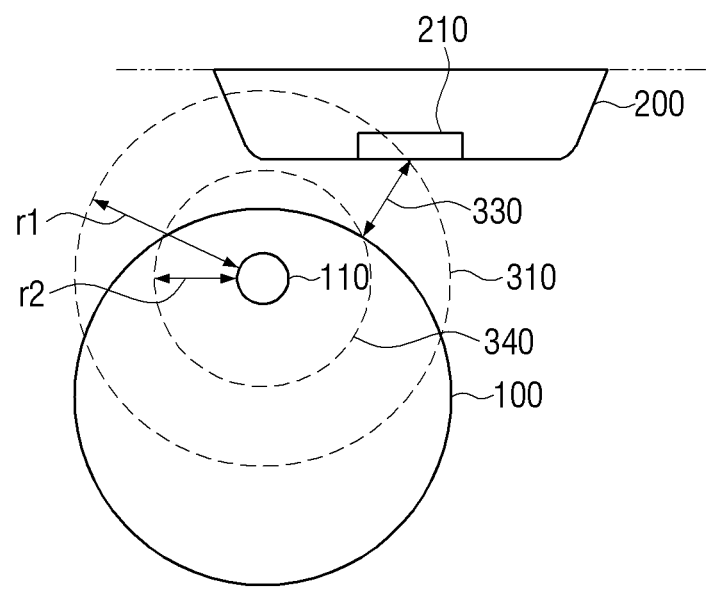
FIG. 3B is a view for illustrating a process in which the mobile robot device decreases a frequency of the LiDAR sensor 110 according to an embodiment.
Figure 3C:
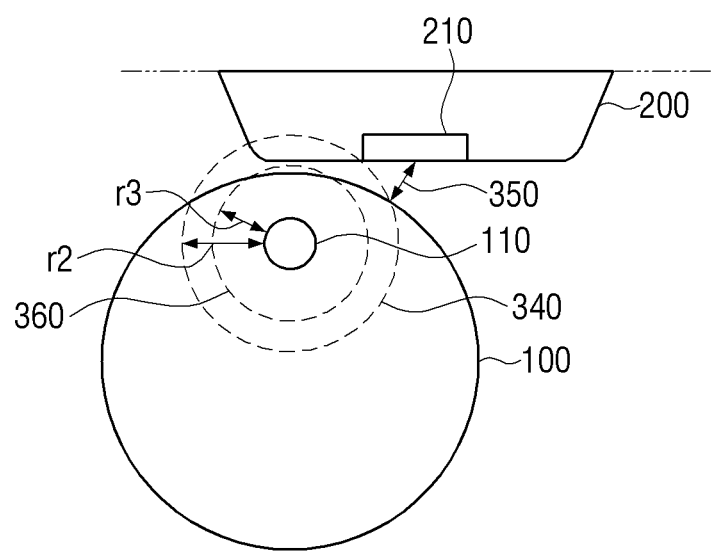
FIG. 3C is a view illustrating a process in which the mobile robot device decreases a frequency of the LiDAR sensor 110 according to an embodiment.

FIGS. 3A to 3C are views for illustrating a process in that the mobile robot device 100 decreases the frequency of the LiDAR sensor 110 according to an embodiment.

As illustrated in FIG. 3A, the mobile robot device 100 may obtain the first position relative to the charging station 200 (or the docking point 210 of the charging station 200) via the LiDAR sensor 110 that uses the first frequency. Specifically, the mobile robot device 100 may obtain the information regarding the direction and the distance to the charging station 200 based on the current position via the LiDAR sensor 110. For example, as illustrated in FIG. 3A, the information regarding the distance and the direction to the charging station 200 obtained by the mobile robot device 100 may be information regarding the distance and the direction of a shortest straight line 320 between the mobile robot device 100 and the docking point 210 of the charging station 200. The mobile robot device 100 may move to the charging station 200 based on the obtained information regarding the distance and the direction to the charging station 200.

As illustrated in FIG. 3B, the mobile robot device 100 may identify whether the distance to the charging station 200 is within the first distance while moving to the charging station 200.

In an embodiment, the mobile robot device 100 may identify whether the distance to the charging station 200 is within the first distance based on the information regarding the first distance stored in memory 130. For example, the mobile robot device 100 may store information indicating that a straight line 330 illustrated in FIG. 3B or a distance within a threshold error range is the first distance, in memory 130. When the distance to the charging station 200 obtained via the LiDAR sensor 110 is identified as the distance of the straight line 330 illustrated in FIG. 3B or the distance in the threshold error range, the mobile robot device 100 may identify that the distance to the charging station 200 is within the first distance.

In still another embodiment, the mobile robot device 100 may identify that the distance to the charging station 200 is within the first distance based on the point cloud corresponding to the charging station 200 obtained via the LiDAR sensor 110 that uses the first frequency. As illustrated in FIG. 3B, the shortest measurable distance of the LiDAR sensor 110 that uses the first frequency is r1 and a part of the charging station 200 is included in a minimum measurable circle 310 having r1 as a radius. Accordingly, the mobile robot device 100 may not obtain the point cloud corresponding to the entire charging station 200 via the LiDAR sensor 110 that uses the first frequency.

The mobile robot device 100 may obtain the similarity value between the pattern of the obtained point cloud corresponding to the charging station 200 and the predetermined pattern and identify whether the obtained similarity value is greater than the threshold value. As illustrated in FIG. 3B, since the mobile robot device 100 did not obtain the point cloud corresponding to the entire charging station 200, the mobile robot device 100 may identify that the similarity value obtained by comparing the pattern of the point cloud with the predetermined pattern to be less than the threshold value. When the similarity value is identified to be less than the threshold value, the mobile robot device 100 may identify that the distance to the charging station 200 is within the first distance 320.

When the distance to the charging station 200 is within the first distance 320, the mobile robot device 100 may change the frequency of the LiDAR sensor 110 to the second frequency less than the first frequency. As illustrated in FIG. 3B, when the frequency of the LiDAR sensor 110 decreases to the second frequency, the shortest measurable distance of the LiDAR sensor 110 decreases from r1 to r2. Accordingly, a part of the charging station 200 may not be included in a minimum measurable circle 340 according to the second frequency having r2 as a radius. Therefore, the mobile robot device 100 may more accurately grasp the information regarding the direction and the distance to the charging station 200 by decreasing the frequency of the LiDAR sensor 110.

The mobile robot device 100 may obtain the distance the mobile robot device 100 has moved through the distance of the straight line 320 when the first position relative to the charging station 200 is obtained and the distance when the distance to the charging station is identified to be within the first distance 320. The mobile robot device 100 may obtain the distance from the current position of the mobile robot device 100 to the docking point 210 of the charging station 200 based on the distance the mobile robot device 100 has moved. The mobile robot device 100 may predict a region of the docking point 210 that may be included in the minimum measurable circle of the LiDAR sensor 110 that uses the first frequency while the mobile robot device 10 moves from the current position to a position separated from the docking point 210 of the charging station 200 by a threshold distance. The mobile robot device 100 may calculate and identify the second frequency of the LiDAR sensor 110 so that the docking point 210 is not included within the minimum measurable distance circle, when the mobile robot device 100 is at a position separated from the docking point 210 by a threshold distance, based on the predicted region of the docking point 210. When the second frequency calculated by the mobile robot device 100 is beyond a variable frequency range of the LiDAR sensor 110, the mobile robot device 100 may identify the frequency of the LiDAR sensor 110 as the minimum frequency among the variable frequencies capable of being emitted by the LiDAR sensor 110.

The mobile robot device 100 may obtain the second position relative to the charging station 200 (or docking point 210 of the charging station 200) via the LiDAR sensor 110 that uses the second frequency. The mobile robot device 100 may move to the charging station 200 based on the obtained second position relative to the charging station 200.

As illustrated in FIG. 3C, when the distance to the charging station 200 is identified to be within a second distance 350 via the LiDAR sensor 110 that uses the second frequency while the mobile robot device 100 moves, the mobile robot device 100 may change the frequency of the LiDAR sensor 110 to the third frequency less than the second frequency.

In an embodiment, the mobile robot device 100 may identify that the distance to the charging station 200 is within the second distance based on the information regarding the second distance stored in memory 130. When the distance to the charging station 200 obtained via the LiDAR sensor 110 is identified to be within the threshold error range of the second distance stored in memory 130, the mobile robot device 100 may identify that the distance to the charging station 200 is within the second distance.

In still another embodiment, the mobile robot device 100 may identify that the distance to the charging station 200 is within the second distance based on the similarity value between the pattern of the point cloud corresponding to the charging station 200 obtained via the LiDAR sensor 110 that uses the second frequency and the pattern stored in memory 130. As illustrated in FIG. 3C, since the shortest measurable distance of the LiDAR sensor 110 that uses the second frequency is r2 and a part of the charging station 200 is included in the minimum measurable circle 340 having r2 as a radius, the mobile robot device 100 may identify that the similarity value between the pattern of the point cloud corresponding to the charging station 200 and the pattern stored in advance is less than a threshold value. At this time, the mobile robot device 100 may identify that the distance to the charging station 200 is within the second distance 350. When the similarity value is identified to be less than the threshold value, the mobile robot device 100 may change the frequency of the LiDAR sensor 110 to the third frequency less than the second frequency.

When the frequency of the LiDAR sensor 110 is decreased from the second frequency to the third frequency, the shortest measurable distance of the LiDAR sensor 110 may be decreased from r2 to r3. In addition, even if the mobile robot device 100 moves by a threshold distance of the docking point 210 of the charging station 200, the docking point 210 may not be included in the minimum measurable circle 360 of the LiDAR sensor 110 that uses the third frequency or a smaller part thereof is included compared to the minimum measurable circle 360 according to the second frequency.

FIG. 4 is a flowchart for illustrating a method of controlling the mobile robot device 100 according to an embodiment. Specifically, FIG. 4 is a flowchart for illustrating an embodiment in which the mobile robot device 10 identifies that the distance to the charging station 200 is within the first distance and the second distance based on the point cloud corresponding to the charging station 200.

The mobile robot device 100 may move towards the charging station 200 based on a first position relative to the charging station 110 obtained via the LiDAR sensor 110 that uses the first frequency (S410). The mobile robot device 100 may obtain a similarity value between a pattern of the point cloud corresponding to the charging station 200 obtained via the LiDAR sensor 110 and a pattern stored in memory 130. Specifically, the mobile robot device 100 may obtain a value of similarity between the pattern of the point cloud (e.g., the number of points and the shape formed of the point cloud) corresponding to the charging station 200 and the pattern stored in memory 130.

The mobile robot device 100 may identify whether the obtained similarity value is greater than the threshold value (S435). When the similarity value is identified to be equal to or than the threshold value, the mobile robot device 100 may move towards the charging station 200 based on the obtained first position relative to the charging station 200. When the similarity value is identified to be less than the threshold value, the mobile robot device 100 may identify that the distance to the charging station 200 is within the first distance (S440).

The mobile robot device 100 may identify a size of the second frequency based on the distance measurable by the LiDAR sensor 110 using the first frequency and the distance the mobile robot device 100 has moved (S445). The mobile robot device 100 may change the frequency of the LiDAR sensor 110 from the first frequency to the identified second frequency. The process of determining the second frequency has been described above and therefore overlapped redundant description will not be repeated. In still another embodiment, when the distance to the charging station 200 is identified to be within the first distance, the mobile robot device 100 may change the frequency of the LiDAR sensor 110 to the second frequency less than the first frequency by a predetermined value. The predetermined value may vary depending on a type or a size of the mobile robot device 100 and may also be changed according to a setting by a user.

The mobile robot device 100 may obtain the second position relative to the charging station 200 via the LiDAR sensor 110 that uses the second frequency and may move to the charging station 200 based on the obtained relative second position (S450). Meanwhile, the mobile robot device 100 may obtain the similarity value between the pattern of the point cloud corresponding to the charging station 200 obtained via the LiDAR sensor 110 that uses the second frequency and the pattern stored in advance (S455). Then, the mobile robot device 200 may identify whether the obtained similarity value is greater than the threshold value (S460).

When the similarity value is identified to be equal to or greater than the threshold value, the mobile robot device 100 may move towards the charging station 200 based on the obtained second position relative to the charging station 200. On the other hand, when the similarity value is identified to be less than the threshold value, the mobile robot device 100 may identify that the distance to the charging station 200 is within the second distance (S465).

The mobile robot device 100 may identify whether the second frequency is the minimum frequency of the LiDAR sensor 110 (S470). When the second frequency is not the minimum frequency of the LiDAR sensor 110, the mobile robot device 100 may change the frequency of the LiDAR sensor 110 to the third frequency less than the second frequency (S480).

When the second frequency is the minimum frequency of the LiDAR sensor 110, the mobile robot device 100 may predict the third position relative to the charging station 200 based on the pattern of the obtained point cloud corresponding to the charging station 200 and the pattern stored in advance (S490). Specifically, even when the distance to the charging station 200 is identified to be within the second distance, if the frequency currently used by the LiDAR sensor 110 is the minimum frequency among variable frequencies capable of being emitted by the LiDAR sensor 110, the mobile robot device 100 may not further decrease the frequency. Accordingly, when the distance to the charging station 200 is within the second distance and the LiDAR sensor 110 currently uses the minimum frequency, the mobile robot device 100 may compare the pattern of the point cloud corresponding to the charging station 200 obtained when the distance to the charging station 200 is identified to be within the second distance with the pattern stored in memory 130. The mobile robot device 100 may predict the pattern of the point cloud corresponding to the region of the charging station 200 included in the minimum measurable circle of the LiDAR sensor 110 through the pattern stored in memory 130. The mobile robot device 100 may predict the third position of the charging station 200 based on the point cloud corresponding to the charging station 200 included in the predicted pattern of the point cloud. Then, the mobile robot device 100 may move to the charging station 200 based on the predicted third position.

In another embodiment of the disclosure, when the frequency of the LiDAR sensor 110 is identified as the minimum frequency in a case that the distance to the charging station 200 is identified to be within the first distance, the mobile robot device 100 may predict the second position relative to the charging station 200 by the method described above.

Figure 5A:
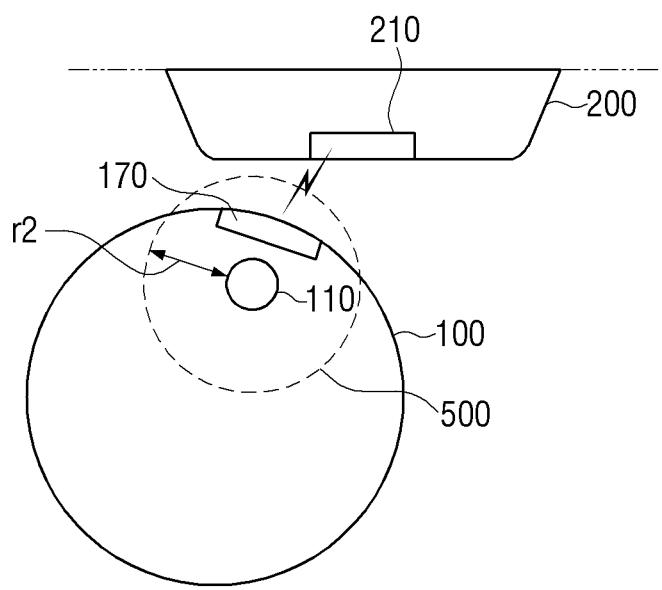
FIG. 5A is a view for illustrating a process in which the mobile robot device docks on a charging station according to an embodiment.
Figure 5B:
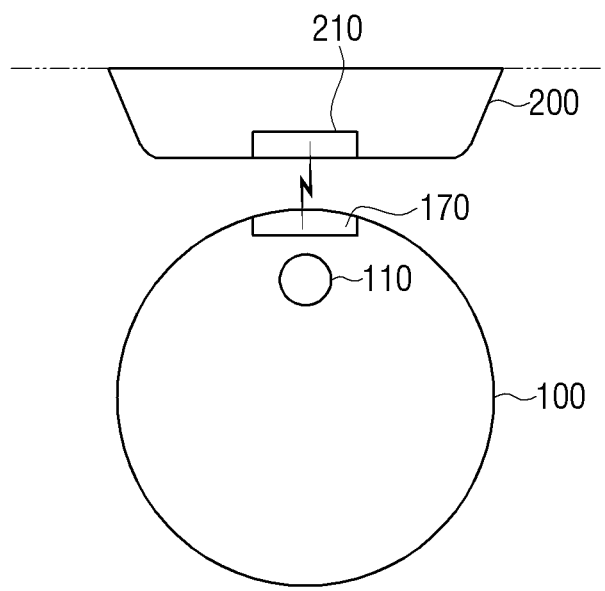
FIG. 5B is a view for illustrating a process in which the mobile robot device docks on the charging station according to an embodiment.

FIGS. 5A and 5B are views for illustrating an embodiment in which the mobile robot device 100 may identify whether to adjust positioning with respect to the docking point 210 based on the amount of power to be charged, according to an embodiment.

The docking of the mobile robot device 100 on the charging station 200 may include a case that the mobile robot device 100 has approached the docking point 210 of the charging station 200 within a threshold distance. When the mobile robot device 100 moves to a point within the threshold distance to the docking point 210 of the charging station 200, the mobile robot device 100 may receive charged power from the charging station 200 via the battery 170 including a power receiver for wireless charging. The power receiver of the battery 170 of the mobile robot device 100 may include a reception resonator. In addition, it is possible to achieve and maintain the threshold charging efficiency only if the reception resonator of the mobile robot device 100 and the transmission resonator of the charging station 200 are aligned. Accordingly, the mobile robot device 100 may identify whether to adjust positioning relative to the docking point 210 of the charging station 200 based on the amount of charged power received from the charging station 200.

As illustrated in FIG. 5A, when the mobile robot device 100 has approached within the threshold distance to the docking point 210 and is docked to receive power, the mobile robot device 100 may receive power from the charging station 200 via a power receiver included in the battery 170. In addition, the mobile robot device 100 may identify or identify whether the amount of charged power received from the charging station 200 or rate of power transfer is less than a predetermined value. The predetermined value may vary depending on a type of the battery 170 of the mobile robot device 100 and may be changed by a user.

When the amount of charged power received from the charging station is identified to be less than the predetermined value, the mobile robot device 100 may identify to adjust positioning relative to the docking point 210 of the mobile robot device 100. The mobile robot device 100 may obtain a position relative to the docking point 210 of the charging station 200 via the LiDAR sensor 110 and move so that the mobile robot device 100 and the docking point 210 are more accurately aligned based on the obtained relative position. On the other hand, when the similarity value between the pattern of the point cloud corresponding to the docking point 210 obtained via the LiDAR sensor 110 and the pattern stored in advance is less than the threshold value, the mobile robot device 100 may change the frequency of the LiDAR sensor 110 to a frequency less than the current frequency. For example, when a part of the docking point 210 is included within the shortest measurable distance r2 of the LiDAR sensor 110 illustrated in FIG. 5A and within a minimum measurable circle 500 having r2 as a radius, the mobile robot device 100 may identify that the similarity value between the pattern of the point cloud corresponding to the docking point 210 obtained via the LiDAR sensor 110 and the pattern stored in memory 130 is less than the threshold value. In this case, the mobile robot device 100 may change the frequency of the LiDAR sensor 110 to a frequency less than the current frequency and change the shortest measurable distance from r2 to a shorter distance. The process of changing the frequency has been described above and overlapped redundant description will not be repeated.

As illustrated in FIG. 5B, in an embodiment, the mobile robot device 100 may move to be more precisely aligned with the docking point 210. When the amount of charged power received from the charging station 200 is equal to or greater than the predetermined value, the mobile robot device 100 may determine that no further positional adjustment is necessary. In still another embodiment, the mobile robot device 100 may identify whether the amount of the charged power received from the charging station 200 is equal to or greater than the predetermined value while the mobile robot device 100 moves to be aligned with the docking point 210. When it is identified whether the amount of charged power is equal to or greater than the predetermined value, the mobile robot device 100 may determine that no further positional adjustment is necessary and receive the charged power from the charging station 200.

FIG. 6 is a view for illustrating a method of controlling the mobile robot device 100 according to an embodiment.

The mobile robot device 100 may obtain the first position relative to the charging station 200 (or docking point 210 of the charging station 200) based on a result obtained by scanning the surroundings of the mobile robot device 100 by the LiDAR sensor 110 using the first frequency (S610). The first position relative to the charging station 200 may include information regarding the distance and the direction from the mobile robot device 100 to the charging station 200.

The mobile robot device 100 may move to the charging station 200 based on the first position relative to the charging station 200 (S620). The mobile robot device 100 may identify whether the distance to the charging station 200 is within the first distance while moving (S630). In embodiment, the mobile robot device 100 may identify whether the distance to the charging station 200 is within the first distance based on the information regarding the first distance stored in memory 130. In another embodiment, the mobile robot device 100 may identify whether the distance to the charging station 200 is within the first distance based on the similarity value between the pattern of the point cloud corresponding to the charging station 200 and the pattern stored in memory 130. When the similarity value is identified to be less than the threshold value, the mobile robot device 100 may identify that the distance to the charging station is within the first distance.

When the distance to the charging station 100 is within the first distance, the mobile robot device 100 may control the LiDAR sensor 110 to scan the surroundings of the mobile robot device 100 by changing the frequency of the LiDAR sensor 110 to the second frequency less than the first frequency (S640). In other words, the mobile robot device 100 may more accurately obtain the distance to the charging station 200 and the position thereof by decreasing the frequency of the LiDAR sensor 110.

In accordance with various embodiments of the disclosure described above, the mobile robot device may accurately recognize the docking point of the charging station by decreasing the scanning frequency of the distance sensor in accordance with the distance to the charging station, thereby more accurately and precisely docking and increasing charging efficiency.

In addition, the mobile robot device according to an embodiment of the disclosure may perform more accurate docking by determining whether the mobile robot device has accurately docked on the charging station based on the amount of power and rate of power exchanged between the charging station and the mobile robot device 100.

Various embodiments of the disclosure may be implemented as software including instructions stored in machine (e.g., computer)-readable storage media. The machine is a device that invokes instructions stored in the storage medium and is operated according to the invoked instructions, and may include an electronic device (e.g., mobile robot device 100) according to the disclosed embodiments. In a configuration the instruction is executed by a processor, the processor may perform a function corresponding to the instruction directly or using other elements under the control of the processor. The instruction may include a code made by a compiler or a code executable by an interpreter.

The machine-readable storage medium may be provided in a form of a non-transitory storage medium. Here, the "non-transitory storage medium" is tangible and may not include signals, and it does not distinguish that data is semi-permanently or temporarily stored in the storage medium.

For example, the "non-transitory storage medium" may include a buffer temporarily storing data.

Each of the elements (e.g., a module or a program) according to various embodiments may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

According to an embodiment, the methods according to various embodiments of this disclosure may be provided to be included in a computer program product. The computer program product may be exchanged between a seller and a purchaser as a commercially available product. The computer program product may be distributed in the form of a machine-readable storage medium (e.g., compact disc read only memory (CD-ROM)) or distributed online (e.g., downloading or uploading) through an application store (e.g., PlayStore™) or directly between two user devices (e.g., smartphones). In a case of the on-line distribution, at least a part of the computer program product (e.g., downloadable application) may be at least temporarily stored or temporarily generated in a device-readable storage medium such as a memory of a server of a manufacturer, a server of an application store, or a relay server.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A mobile robot device comprising:
a driving unit configured to control movement of the mobile robot device;
a memory;
a light detection and ranging (LiDAR) sensor configured to emit first light of a first frequency and second light of a second frequency that is less than the first frequency; and
a processor configured to:
obtain a first position of the mobile robot device relative to a charging station based on scanning a surrounding environment of the mobile robot device by the LiDAR sensor emitting the first light,
control the driving unit to move the mobile robot device towards the charging station based on the first position of the mobile robot device relative to the charging station, identify whether a distance from the mobile robot device to the charging station is within a first distance,
based on the distance from the mobile robot device to the charging station being within the first distance, obtain a second position of the mobile robot device relative to the charging station based on scanning the surrounding environment of the mobile robot device by the LiDAR sensor emitting the second light, and
control the driving unit to move the mobile robot device towards the charging station based on the second position of the mobile robot device relative to the charging station.

2. The mobile robot device according to claim 1, wherein the processor is configured to:
obtain a similarity value between a pattern of a point cloud corresponding to the charging station obtained via the LiDAR sensor and a pattern stored in the memory; and
identify whether the similarity value is greater than a threshold value.

3. A mobile robot device comprising:
a driving unit configured to control movement of the mobile robot device;
a memory;
a light detection and ranging (LiDAR) sensor configured to emit first light of a first frequency and second light of a second frequency that is less than the first frequency; and
a processor configured to:
obtain a first position of the mobile robot device relative to a charging station based on scanning a surrounding environment of the mobile robot device by the LiDAR sensor emitting the first light;

control the driving unit to move the mobile robot device towards the charging station based on the first position of the mobile robot device relative to the charging station, identify whether a distance from the mobile robot device to the charging station is within a first distance, based on the distance from the mobile robot device to the charging station being within the first distance, obtain a second position of the mobile robot device relative to the charging station based on scanning the surrounding environment of the mobile robot device by the LiDAR sensor emitting the second light;

control the driving unit to move the mobile robot device towards the charging station based on the second position of the mobile robot device relative to the charging station;

obtain a similarity value between a pattern of a point cloud corresponding to the charging station obtained via the LiDAR sensor and a pattern stored in the memory;

identify whether the similarity value is greater than a threshold value;

based on the similarity value being less than the threshold value, determine the distance from the mobile robot device to the charging station to be within the first distance; and based on the similarity value being equal to or greater than the threshold value, control the driving unit to move the mobile robot device towards the charging station based on the first position of the mobile robot device relative to the charging station.

4. The mobile robot device according to claim 1, wherein the first distance is stored in the memory.

5. The mobile robot device according to claim 1, wherein the processor is configured to:
based on the distance from the mobile robot device to the charging station being within the first distance, identify a magnitude of the second frequency based on a distance measurable by the LiDAR sensor using the first frequency and a travel distance the mobile robot device has moved.

6. The mobile robot device according to claim 1, wherein the processor is configured to:
based on a frequency of the LiDAR sensor being changed from the first frequency to the second frequency, obtain the second position of the mobile robot device relative to the charging station via the LiDAR sensor emitting the second light; and control the driving unit to move the mobile robot device towards the charging station based on the second position of the mobile robot device relative to the charging station.

7. The mobile robot device according to claim 6, wherein the processor is configured to:
based on the distance from the mobile robot device to the charging station being within a second distance less than the first distance, control the LiDAR sensor to scan the surrounding environment of the mobile robot device by changing the frequency of the LiDAR sensor to a third frequency that is less than the second frequency.

8. The mobile robot device according to claim 6, wherein the processor is configured to:

based on the mobile robot device being docked on a docking point of the charging station, identify an amount of power received from the charging station.

9. The mobile robot device according to claim 8, wherein the processor is configured to:
based on the amount of power received from the charging station being less than a predetermined value, obtain a third position of the mobile robot device relative to the docking point of the charging station via the LiDAR sensor, and control the driving unit to move the mobile robot device to the docking point of the charging station based on the third position of the mobile robot device relative to the docking point of the charging station.

10. The mobile robot device according to claim 1, wherein the processor is configured to:
based on the second frequency being a minimum frequency of the LiDAR sensor and the distance from the mobile robot device to the charging station being within a second distance that is less than the distance from the mobile robot device to the charging station via the LiDAR sensor that uses the second frequency, predict a third position of the mobile robot device relative to the charging station based on a pattern of a point cloud corresponding to the charging station obtained via the LiDAR sensor and a pattern stored in the memory.

11. A method of controlling a mobile robot device comprising a LiDAR sensor and a driving unit, the method comprising:
obtaining a first position of the mobile robot device relative to a charging station based on scanning a surrounding environment of the mobile robot device by the LiDAR sensor emitting first light of a first frequency;

moving the mobile robot device towards the charging station based on the first position of the mobile robot device relative to the charging station;

identifying whether a distance from the mobile robot device to the charging station is within a first distance;

based on the distance from the mobile robot device to the charging station being within the first distance, obtaining a second position of the mobile robot device relative to the charging station based on scanning the surrounding environment of the mobile robot device by the LiDAR sensor emitting a second light of a second frequency less than the first frequency; and moving the mobile robot device towards the charging station based on the second position of the mobile robot device relative to the charging station.

12. The method according to claim 11, wherein the identifying comprises:
obtaining a similarity value between a pattern of a point cloud corresponding to the charging station obtained via the LiDAR sensor and a pattern stored in the mobile robot device; and identifying whether the similarity value is greater than a threshold value.

13. The method according to claim 12, further comprising:
based on the similarity value being less than the threshold value, identifying the distance from the mobile robot device to the charging station to be within the first distance; and based on the similarity value being equal to or greater than the threshold value, moving the mobile robot device towards the charging station based on the first position of the mobile robot device relative to the charging station.

14. The method according to claim 11, wherein the controlling comprises:
based on the distance from the mobile robot device to the charging station being within the first distance, identifying a magnitude of the second frequency based on a distance measurable by the LiDAR sensor using the first frequency and a travel distance the mobile robot device has moved.

15. The method according to claim 11, wherein the controlling comprises:
based on a frequency of the LiDAR sensor being changed from the first frequency to the second frequency, obtaining the second position of the mobile robot device relative to the charging station via the LiDAR sensor emitting the second light; and
controlling the driving unit to move the mobile robot device towards the charging station based on the second position of the mobile robot device relative to the charging station.

16. The method according to claim 15, further comprising:
based on the distance from the mobile robot device to the charging station being within a second distance less than the first distance, controlling the LiDAR sensor to scan the surrounding environment of the mobile robot device by changing the frequency of the LiDAR sensor to a third frequency that is less than the second frequency.

17. The method according to claim 15, further comprising:
based on the mobile robot device being docked on a docking point the charging station, determining an amount of power received from the charging station.

18. The method according to claim 17, wherein the determining comprises:
based on the amount of power received from the charging station being less than a predetermined value, obtaining a third position of the mobile robot device relative to the docking point of the charging station via the LiDAR sensor, and controlling the driving unit to move the mobile robot device to the docking point of the charging station based on the third position of the mobile robot device relative to the docking point of the charging station.

19. The mobile robot device according to claim 1, wherein the processor is configured to:
based on the mobile robot device being docked on a docking point of the charging station, identify whether to additionally control the driving unit to move the mobile robot device based on an amount of power received from the charging station.

20. The mobile robot device according to claim 1, wherein the processor is configured to:
based on the mobile robot device being docked on a docking point of the charging station, additionally control the driving unit to move the mobile robot device based on an amount of power received from the charging station being less than a predetermined value.

* * * * *